UNITED STATES PATENT OFFICE.

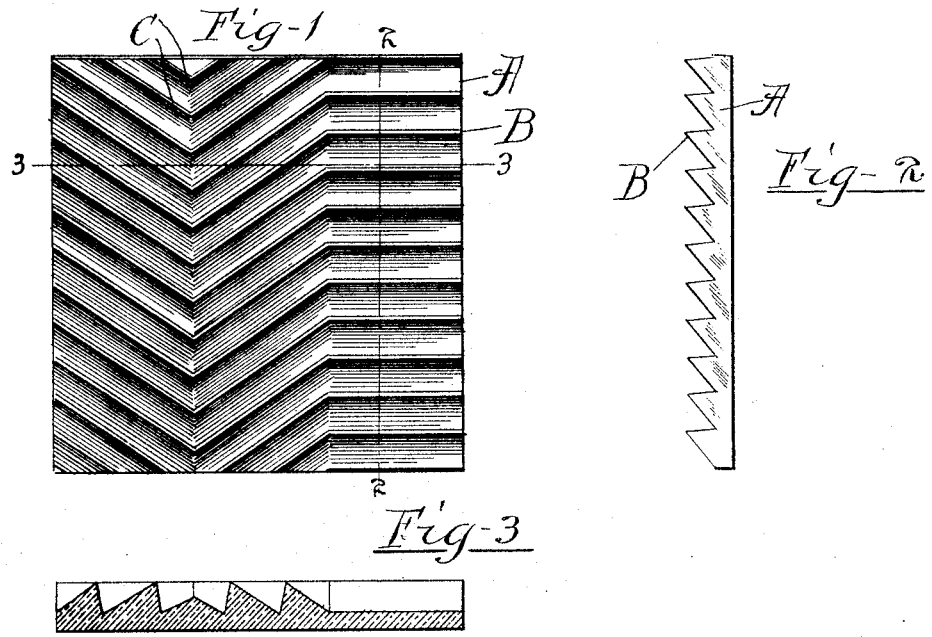

OLIN H. BASQUIN, OF CHICAGO, ILLINOIS, ASSIGNOR TO THE LUXFER PRISM PATENTS COMPANY, OF SAME PLACE.

LIGHT-DIFFUSING DEVICE.

SPECIFICATION forming part of Letters Patent No. 586,217, dated July 13, 1897.

Application filed March 15, 1897. Serial No. 627,723. (No model.)

*To all whom it may concern:*

Be it known that I, OLIN H. BASQUIN, a citizen of the United States, residing at Chicago, in the county of Cook and State of Illinois, have invented certain new and useful Improvements in Light-Diffusing Devices, of which the following is a specification.

My invention relates to light-diffusing devices—such, for example, as prismatic windows—and has for its object a new and improved device for this purpose, of which the following is a description, reference being had to the accompanying drawings, wherein—

Figure 1 is a face view of a section of window-glass embodying my invention. Fig. 2 is a section on line 2 2, Fig. 1. Fig. 3 is a section on line 3 3, Fig. 1.

Like letters refer to like parts throughout the several figures.

It has been the practice heretofore in forming prismatic glass or the like for windows to form such glass so that the light is projected substantially straight forward from the window.

One of the objects of my present invention is to provide a glass for diffusing light which in the place of or in addition to projecting the light straight forward may throw the light to either side or in some other direction than straight forward. It often happens that the light is only admitted to the window through a small opening, as in alleys and where there are obstructions in front of the window, and under such conditions the ordinary prismatic glass cannot be satisfactorily used. It also often happens that a large room must be lighted by a window at one side thereof. Hence it is necessary to throw the light in some other direction than straight forward toward the rear of the room. Under such and like conditions the window must be so formed as to direct the light toward the place which it is desired to illuminate.

I have illustrated in the drawings a construction showing the ordinary prismatic glass modified in form so as to embody my invention.

In Fig. 1 I have shown a face view of the ordinary section A of prismatic glass provided with projecting ribs or prisms B. These prisms in the ordinary prismatic glass extend straight across the face of the glass. As shown in Fig. 1, these prisms are displaced or bent out of line at some portion along their length, as at C, so as to be forced out of their original line. I have found that when the prisms are so formed the light in addition to being thrown straight forward is thrown in some other direction—as, for example, toward the sides of the window. I have also found that the light can be directed toward any given point by displacing these prisms to a given degree.

Fig. 3 shows a section through the glass after the prisms have been displaced so as to embody my invention.

The displacement of the prisms in any given case will depend, of course, upon the result desired and the conditions to be met, as the direction in which the light is thrown will be controlled by the position of these prisms.

I have spoken of "prismatic" glass, the trade name for the article to which I refer, and the name which I prefer to employ is "prism-light." The prism-lights may, as illustrated, have some of their portions remaining in the original line, while the rest is bent out of that line and carried forward in one or more right lines.

I claim—

1. A prism-light comprising a substantially flat glass body with prisms on one side, some of said prisms extending in a broken straight line across the body substantially from edge to edge.

2. A prism-light comprising a substantially flat glass body with prisms on one side, some of said prisms extending in a broken straight line across the body substantially from edge to edge, and the edges of the adjacent prisms substantially equidistant from each other throughout their lengths.

3. A prism-light comprising a substantially flat glass body having a substantially plane surface on one side and with prisms on the other side, some of said prisms extending in a broken straight line across the body substantially from edge to edge.

4. A prism-light comprising a substantially flat glass body having a substantially plane surface on one side and with prisms on the other side, some of said prisms extending in a broken straight line across the body substantially from edge to edge, and the edges of the adjacent prisms substantially equidistant from each other throughout their lengths.

OLIN H. BASQUIN.

Witnesses:
DONALD M. CARTER,
LILLEY W. JOHNSTONE.